(12) United States Patent
Rawat et al.

(10) Patent No.: US 8,095,597 B2
(45) Date of Patent: Jan. 10, 2012

(54) METHOD AND SYSTEM OF AUTOMATING DATA CAPTURE FROM ELECTRONIC CORRESPONDENCE

(75) Inventors: Jai Rawat, Sunnyvale, CA (US); Silvia Doundakova, San Jose, CA (US); Oswald Dominic D'sa, Cupertino, CA (US); Julian Gordon, Marlborough, MA (US); Renuka Kulkarni, Iselin, NJ (US); Vijayasankar Dhanapal, Mountain View, CA (US); Srinivas Gubbala, Mountain View, CA (US); Santhosh Raman, Mountain View, CA (US); Rajiv Anand, Santa Clara, CA (US)

(73) Assignee: AOL Inc., Dulles, VA (US)

( * ) Notice: Subject to any disclaimer, the term of this patent is extended or adjusted under 35 U.S.C. 154(b) by 2189 days.

(21) Appl. No.: 09/846,741

(22) Filed: May 1, 2001

(65) Prior Publication Data

US 2002/0174185 A1     Nov. 21, 2002

(51) Int. Cl.
*G06F 15/16* (2006.01)

(52) U.S. Cl. ........................................ 709/206; 709/207
(58) Field of Classification Search .................... 705/64, 705/75, 76, 78, 79, 26, 39–41, 34; 709/246, 709/206, 203, 207, 236
See application file for complete search history.

(56) References Cited

U.S. PATENT DOCUMENTS

| | | | |
|---|---|---|---|
| 5,060,263 A | 10/1991 | Bosen et al. | |
| 5,159,667 A | 10/1992 | Borrey et al. | |
| 5,224,150 A | 6/1993 | Neustein | |
| 5,235,654 A | 8/1993 | Anderson | |
| 5,267,149 A | 11/1993 | Anada et al. | |
| 5,473,667 A | 12/1995 | Neustein | |
| 5,544,322 A | 8/1996 | Cheng et al. | |
| 5,564,038 A | 10/1996 | Grantz et al. | |
| 5,574,786 A | 11/1996 | Dayan et al. | |
| 5,590,197 A | 12/1996 | Chen et al. | |
| 5,590,198 A | 12/1996 | Lee et al. | |
| 5,608,874 A * | 3/1997 | Ogawa et al. | 709/246 |

(Continued)

FOREIGN PATENT DOCUMENTS

EP          0558222          9/1993

(Continued)

OTHER PUBLICATIONS

Keul, M.; "Avoid confusing messages caused by password filters"; Windows Developer Magazine; Feb. 2002; Windows Developer Magazine, pp. 32-36.

(Continued)

*Primary Examiner* — Kristie D Shingles
(74) *Attorney, Agent, or Firm* — Michael A. Glenn; Glenn Patent Group

(57) ABSTRACT

A method and system of automating capture of electronic data provide a user with an effective universal Internet identity and e-mail address, comprehensive e-mail filtering and forwarding services, and e-receipt identification and data extraction. Detailed user e-mail preferences data stored at a central server may be selectively altered such that incoming correspondence is redirected in accordance with the user's preferences. Computer program code at the central server parses incoming e-mail header information and data content, selectively extracts data from identified types of correspondence, and forwards extracted data in accordance with user preferences data. Additional computer program code may manipulate the extracted data in accordance with format requirements and display the manipulated data to a user in a desired format.

10 Claims, 5 Drawing Sheets

U.S. PATENT DOCUMENTS

| | | | | |
|---|---|---|---|---|
| 5,640,577 | A | 6/1997 | Schawmer | 395/768 |
| 5,659,350 | A | 8/1997 | Hendricks et al. | |
| 5,675,771 | A | 10/1997 | Curley et al. | |
| 5,684,950 | A | 11/1997 | Dare et al. | |
| 5,694,595 | A | 12/1997 | Jacobs et al. | |
| 5,710,889 | A | 1/1998 | Clark et al. | |
| 5,711,000 | A | 1/1998 | Ploeg et al. | |
| 5,712,973 | A | 1/1998 | Dayan et al. | |
| 5,729,689 | A | 3/1998 | Allard et al. | |
| 5,739,512 | A * | 4/1998 | Tognazzini | 235/380 |
| 5,758,341 | A | 5/1998 | Voss | |
| 5,764,890 | A | 6/1998 | Glasser et al. | |
| 5,771,347 | A | 6/1998 | Grantz et al. | |
| 5,784,463 | A | 7/1998 | Chen et al. | |
| 5,790,785 | A | 8/1998 | Klug et al. | |
| 5,793,952 | A | 8/1998 | Limsico | |
| 5,794,259 | A | 8/1998 | Kikinis | 707/507 |
| 5,799,115 | A | 8/1998 | Asano et al. | 382/305 |
| 5,821,933 | A | 10/1998 | Keller et al. | |
| 5,832,497 | A | 11/1998 | Taylor | |
| 5,848,412 | A | 12/1998 | Rowland et al. | |
| 5,890,140 | A | 3/1999 | Clark et al. | |
| 5,903,878 | A * | 5/1999 | Talati et al. | 705/26 |
| 5,918,007 | A | 6/1999 | Blackledge, Jr. et al. | |
| 5,944,824 | A | 8/1999 | He | |
| 5,961,593 | A | 10/1999 | Gabber et al. | |
| 5,963,949 | A | 10/1999 | Gupta et al. | |
| 5,970,227 | A | 10/1999 | Dayan et al. | |
| 5,974,430 | A * | 10/1999 | Mutschler et al. | 715/505 |
| 5,983,351 | A | 11/1999 | Glogau | |
| 5,991,537 | A | 11/1999 | McKeon et al. | |
| 6,000,033 | A | 12/1999 | Kelley et al. | |
| 6,026,379 | A * | 2/2000 | Haller et al. | 705/34 |
| 6,029,146 | A | 2/2000 | Hawkins et al. | |
| 6,058,378 | A | 5/2000 | Clark et al. | |
| 6,067,529 | A * | 5/2000 | Ray et al. | 705/26 |
| 6,070,184 | A | 5/2000 | Blount et al. | |
| 6,088,700 | A * | 7/2000 | Larsen et al. | 707/10 |
| 6,092,196 | A | 7/2000 | Reiche | |
| 6,151,707 | A | 11/2000 | Hecksel et al. | |
| 6,182,059 | B1 * | 1/2001 | Angotti et al. | 706/45 |
| 6,185,542 | B1 * | 2/2001 | Moran et al. | 705/16 |
| 6,192,380 | B1 * | 2/2001 | Light et al. | 715/505 |
| 6,192,476 | B1 | 2/2001 | Gong | |
| 6,199,079 | B1 | 3/2001 | Gupta et al. | 707/507 |
| 6,223,168 | B1 * | 4/2001 | McGurl et al. | 705/40 |
| 6,226,495 | B1 | 5/2001 | Neustein | |
| 6,226,679 | B1 | 5/2001 | Gupta | |
| 6,233,565 | B1 * | 5/2001 | Lewis et al. | 705/35 |
| 6,247,029 | B1 | 6/2001 | Kelley et al. | 707/507 |
| 6,249,779 | B1 | 6/2001 | Hitt | |
| 6,253,327 | B1 | 6/2001 | Zhang et al. | |
| 6,286,102 | B1 | 9/2001 | Cromer et al. | |
| 6,311,165 | B1 * | 10/2001 | Coutts et al. | 705/21 |
| 6,324,525 | B1 * | 11/2001 | Kramer et al. | 705/40 |
| 6,327,707 | B1 | 12/2001 | McKeeth et al. | |
| 6,341,353 | B1 * | 1/2002 | Herman et al. | 726/5 |
| 6,377,986 | B1 * | 4/2002 | Philyaw et al. | 709/219 |
| 6,401,074 | B1 * | 6/2002 | Sleeper | 705/14 |
| 6,412,070 | B1 | 6/2002 | Van Dyke et al. | |
| 6,418,305 | B1 | 7/2002 | Neustein | |
| 6,421,693 | B1 | 7/2002 | Nishiyama et al. | 707/507 |
| 6,442,600 | B1 * | 8/2002 | Anderson | 709/217 |
| 6,460,042 | B1 | 10/2002 | Hitchcock et al. | |
| 6,460,163 | B1 * | 10/2002 | Bowman et al. | 714/819 |
| 6,463,431 | B1 | 10/2002 | Schmitt | |
| 6,477,647 | B1 * | 11/2002 | Venkatraman et al. | 713/193 |
| 6,487,540 | B1 * | 11/2002 | Smith et al. | 705/21 |
| 6,496,855 | B1 | 12/2002 | Hunt et al. | |
| 6,499,041 | B1 | 12/2002 | Breslau et al. | |
| 6,499,042 | B1 | 12/2002 | Markus | 707/507 |
| 6,501,950 | B1 * | 12/2002 | Smith et al. | 455/423 |
| 6,533,168 | B1 * | 3/2003 | Ching | 235/375 |
| 6,543,683 | B2 * | 4/2003 | Hoffman | 235/375 |
| 6,589,290 | B1 | 7/2003 | Maxwell et al. | |
| 6,662,340 | B2 | 12/2003 | Rawat et al. | |
| 6,694,307 | B2 * | 2/2004 | Julien | 707/3 |
| 6,694,375 | B1 | 2/2004 | Beddus et al. | |
| 6,708,205 | B2 * | 3/2004 | Sheldon et al. | 709/206 |
| 6,732,102 | B1 * | 5/2004 | Khandekar | 707/10 |
| 6,738,749 | B1 * | 5/2004 | Chasko | 705/17 |
| 6,772,216 | B1 * | 8/2004 | Ankireddipally et al. | 709/230 |
| 6,775,675 | B1 * | 8/2004 | Nwabueze et al. | 707/100 |
| 6,802,042 | B2 | 10/2004 | Rangan et al. | |
| 6,845,388 | B1 * | 1/2005 | Philyaw | 709/204 |
| 6,845,390 | B1 | 1/2005 | Jorgenson et al. | |
| 6,854,085 | B1 | 2/2005 | Morse | |
| 6,859,878 | B1 | 2/2005 | Kerr et al. | |
| 6,859,908 | B1 | 2/2005 | Clapper | |
| 6,862,612 | B1 | 3/2005 | Horn et al. | |
| 6,879,966 | B1 * | 4/2005 | Lapsley et al. | 705/78 |
| 6,910,179 | B1 | 6/2005 | Pennell et al. | |
| 6,944,677 | B1 | 9/2005 | Zhao | |
| 6,950,980 | B1 | 9/2005 | Malcolm | |
| 6,950,983 | B1 | 9/2005 | Snavely | |
| 6,981,028 | B1 | 12/2005 | Rawat et al. | |
| 7,050,991 | B2 * | 5/2006 | Ogasawara | 705/22 |
| 7,158,948 | B1 * | 1/2007 | Rodriguez et al. | 705/28 |
| 7,216,292 | B1 | 5/2007 | Snapper et al. | |
| 2001/0027420 | A1 * | 10/2001 | Boublik et al. | 705/26 |
| 2001/0029484 | A1 * | 10/2001 | Schultz et al. | 705/39 |
| 2001/0044810 | A1 | 11/2001 | Timmons | |
| 2001/0049628 | A1 * | 12/2001 | Icho | 705/14 |
| 2002/0062342 | A1 | 5/2002 | Sidles | |

FOREIGN PATENT DOCUMENTS

| | | |
|---|---|---|
| EP | 780805 | 6/1997 |
| EP | 0855659 | 7/1998 |
| EP | 918 424 | 5/1999 |
| EP | 1160648 | 12/2001 |
| JP | H09-319705 | 12/1997 |
| JP | H10-254807 | 9/1998 |
| JP | 2004-501426 | 1/2004 |
| WO | WO 99/46701 | 9/1999 |
| WO | WO 01/09735 | 2/2001 |
| WO | WO01/84359 | 11/2001 |

OTHER PUBLICATIONS

Choppy, Christine et al.; "A Global Semantics for Views"; Feb. 2000; LIPN, Institut Galilee—Universite Paris XIII; 22 pages.

Hauser, Ralf et al.; "Generic Extensions of WWW Browsers"; Jun. 23, 1995; Information Technology Solutions Department, IBM Research Division, Switzerland; 6 pages.

Miller, John A. et al.; "The Future of Web-Based Workflows"; Jul. 1997; Proceedings of the Int'l Workshop on Research Directions in Process Technology; Nancy, France; 6 pages.

Vaughn, et al.; "How to Register a Workstation"; May 28, 1999, Zenworks Cool Solutions; retrieved from url: http://www.novel.com/coolsolutions/zenworks/basics_ws_register.html; 10 pages.

Murphy, Kathleen, "I/Pro Tells Consumers What's in It for Them"; Mar. 1996, Web Week, vol. 2, Issue 3, 1 page.

Kerstetter, Jim; "Microsoft Captures Firefly"; Apr. 1, 1998, PC Week, 2 pages.

Auto Form Fill—Robo Form—Gator Replacement—Prize Tower. com, retrieved online Feb. 2004; google search; 6 pages.

Saffiotti, Alessandro; "Fuzzy Logic in Autonomous Robot Navigation", Nov. 1997; Soft Computing, vol. 1, No. 4, pp. 180-197.

Maret, et al.; "Multimedia Information Interchange:Web Forms Meet Data Servicers": Jun. 1999; Proc. of the IEEE Int'l Conf. on Multimedia Computing and Systems, vol. 3, pp. 499-505, XP000964627, Florence, Italy.

Gator.com; "Gator.com Delivers on the Promise of the Electronic Commerce Modeling Language (ECML) Standart Today"; Jun. 1999; 1 page.

Nagai, Manabu, "Recommendation for Automatically Recommending Favorite Articles"; Jan. 1999; Nikkei multimedia, Japan, Nikkei BP, No. 43, pp. 144-145, Japan.

* cited by examiner

METHOD AND SYSTEM OF AUTOMATING DATA CAPTURE FROM ELECTRONIC CORRESPONDENCE

The present application is related to a copending application, U.S. Ser. No. 09/516,048, filed Mar. 1, 2000, entitled "AN INTERNET INTERFACE SYSTEM". The present application is also related to a copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS". The present application is related to another copending application, U.S. Ser. No. 09/687,991, filed Oct. 13, 2000, entitled "METHOD AND SYSTEM OF AUTOMATING INTERNET INTERACTIONS". The disclosures of these copending applications are hereby incorporated by reference in their entirety.

BACKGROUND OF THE INVENTION

1. Field of the Invention

The present invention relates generally to parsing electronic correspondence, and more particularly to a method and system of recognizing selected forms of electronic correspondence and automating extraction, organization, and display of parsed data.

2. Description of the Related Art

Presently, many computer users primarily employ Internet browser and mail editor applications for accessing the World Wide Web (WWW, or the Web) and for corresponding via electronic mail (e-mail). The typical browser serves as the means by which a user is enabled to navigate from site to site on the Web, and further serves as the interface through which the user is enabled to interact with those sites by accessing the information content and various services provided; the typical mail editor enables the user to engage in digital correspondence, i.e. sending and receiving e-mail.

The capabilities of browser and mail editor applications can vary greatly depending upon the type of terminal and the operating system used. For example, while versions of these types of applications installed at home computers or office workstations, which typically employ graphical user interfaces (GUIs) and large display monitors, may be capable of presenting the content of a particular Web site or the content of e-mail in rich text and high resolution graphics, the versions of the same applications which are typically installed on portable wireless devices may be much more restricted in terms of graphic resolution and display area.

During any given session of Internet exploration, sometimes known as "Web surfing," a user may encounter one or more sites which require registration before the full capabilities of the site can be accessed. In fact, sites requiring registration are becoming more prevalent on a daily basis. Web sites engaged in electronic commerce (e-commerce), for example, typically require registration before purchases can be made or items can be placed up for auction by a particular user. As another example, Web sites which host e-mail services necessarily require registration in order to deliver incoming correspondence to the correct recipient.

As a practical matter, a registered user is burdened with the task of recording or remembering the registration information provided to various Web sites and mail servers. At a minimum, registration at any given Web or e-mail server involves providing a user name, or "login" name, and a password. This data is subsequently used by the server to identify the user each time the user logs in; conversely, access to a particular account will be denied or restricted if the proper account information is not entered at login.

In this general context, some systems have sought to make Internet transactions and interactions more convenient for users (see, e.g. the foregoing copending patent applications). Efforts are being directed toward automating registration and login procedures, establishing global (or Internet-wide) user identities, and creating universal e-mail addresses for users. Though successful with respect to simplifying various types of Internet transactions and thereby facilitating e-commerce, these systems have thus far failed to address a natural consequence of the increasing ease with which e-commerce may be conducted: an increase in e-commerce related e-mail correspondence, much of which may be in the form of electronic receipts (e-receipts).

For example, when a user places an order for the purchase of goods or services through electronic channels, the seller ("e-tailer") or service provider generally supplies an e-receipt subsequent to receiving the order and payment authorization. These e-receipts, electronic correspondence delivered to an e-mail account or address designated by the user, typically include relevant information concerning the transaction: the purchaser's name, shipping and billing addresses, and credit card information; the appropriate product identification, quantity, and unit price; an identifying order reference number; the order date; the shipping status; and so forth.

Information concerning a particular order is usually available for a limited time at the e-commerce site which hosted the transaction. Ordinarily, a user must provide the correct user name, password, and order reference number information each time that user desires to access order information at the host site. In this regard, even accurate records are not useful if they are not readily accessible; when a user stores information conveniently near a home computer, for example, or retrieves electronic correspondence using a particular computer terminal, those records will not be of value when that user is attempting to access an account from a mobile or wireless apparatus or from a computer at another location, such as an office, a library, or a Web cafe. Presently, since even portable and wireless devices are Internet-capable, a user may access the Web or e-mail accounts from virtually any building having telephone service or from any location where cellular or satellite communications are possible. Unless such a user commits an unwieldy amount of user name, password, and other account-specific information to memory, or endeavors always to keep written notes within reach, careful record-keeping practices can ultimately prove of limited utility.

Users may want access to e-commerce order information for a number of reasons. For example, whereas one user may simply be interested in checking the status of an order to determine if and when purchased goods have been shipped, another user may wish to cross-reference e-commerce order data with bank account data available on-line to determine if and when a particular payment, in the correct amount, has cleared the user's bank account.

As a user's e-commerce activity increases, that user becomes increasingly burdened with having to remember or to record more information, related not simply to user names and passwords for registered accounts, but also to specific order numbers and payment authorizations. Since, as noted above, accessing individual registered accounts can be tedious, some users attempting to organize e-commerce data prefer to rely upon e-receipts and shipping updates forwarded to a specified e-mail address from e-commerce vendors and service providers.

While such reliance upon e-receipts and other correspondence can sometimes prove more convenient, to some degree, than repeatedly accessing the site which hosted the transaction, confusion may still prevail when various transactions are at different stages of completion, when a user wishes to access information from more than one computer terminal or wireless device, or when different correspondence is directed to different e-mail accounts. Logistically, keeping track of e-commerce activity through careful monitoring and organizing of incoming e-receipts can be just as difficult as tracking the status of on-line orders through independent login with the various host sites.

Though some systems currently in use, as noted above, are directed to simplifying some of the more tedious mechanisms associated with commercial activity on the Internet, such systems generally do not facilitate the collection and organization of the data generated by e-commerce activity and other electronic correspondence.

With Internet activity increasing and e-commerce growing at a fantastic rate, there is a continuing and escalating need for a convenient and efficient system of organizing a user's e-receipt information. Such a system should take into account the fact that many users are presently accessing the Internet from multiple locations and multiple computer terminals or workstations, some of which may have small or limited-function key pads and lack sophisticated input devices and displays.

SUMMARY OF THE INVENTION

The present invention addresses the foregoing and other shortcomings of e-commerce related systems currently in use by providing a system for identifying, aggregating, and organizing the data associated with the user's on-line commercial transactions. Additionally, the system may be expanded to parse any kind of electronic correspondence, whether e-commerce related or not, and to organize the data extracted therefrom in accordance with user preferences.

The system of the present invention generally includes storing a registered user's personal account information in a secure, encrypted central database which is accessible from any Internet-capable device with a single user name and password. For example, a user name and password may be stored in association with an account at a particular Web site, along with the Uniform Resource Locator, or URL, of that site's login page. For an additional account at an e-mail server, for example, the user may have selected a different user name and a different password; this information, likewise, is stored in the central database, along with the requisite addressing information for that particular e-mail server. Upon login to the system of the present invention, the registered user has access to the full functional capabilities of the system, as well as any and all account information related to that user's various accounts with Web sites and e-mail servers. Ideally, this system requires memorization of only a single user name and a single password, regardless of the number of specific accounts which are maintained at any given time.

Specifically, the present invention is related to a system and method of providing a user with a single, universal e-mail address and comprehensive e-mail filtering, data extraction, and forwarding services. This aspect of the invention may be supported by a centralized, Web-based server which may host the foregoing central database. The present invention may advantageously employ program code at the central server capable of recognizing certain characteristic qualities of e-receipts, in particular, from parsed electronic correspondence; order data related to the transaction identified in the e-receipt may be extracted and organized in accordance with the user's preferences.

According to one embodiment of the present invention, for example, a user having a registered account with the system may be provided with a universal e-mail address to which all correspondence may be directed. Incoming mail, i.e. addressed to the universal e-mail address, may be parsed by program code at the central server; e-mail header information and content may be compared with the user's e-mail preference data records stored in the central database. Header and addressing information may be modified according to preferences specified by the user; in this manner, all inbound correspondence may be forwarded to one or more different e-mail accounts at e-mail servers designated by the user.

Advantageously, all e-mail may be directed to such a single, universal address, irrespective of origin or ultimate destination. A user may adjust the preferences records in the central database to redirect incoming e-mail as desired, without having to apprise family, friends, and business contacts of a change of address, and without fear of misdirected correspondence.

In addition, one embodiment of the system of the present invention may employ program code at the central server for parsing incoming e-mail specifically to identify e-receipts. In accordance with this "receipt capture" aspect of the invention, examination of parsed header and address data may establish that the incoming correspondence contains information which is characteristic of an e-receipt. In the case where the inbound e-mail is determined to be an e-receipt, program code at the central server may extract relevant data content and store information regarding the e-commerce transaction to which the e-receipt is related in the central database.

Similarly, other kinds of electronic correspondence may be parsed such that desired data may be extracted and stored and/or displayed according to user preferences. For example, the system may be configured to recognize incoming e-mail confirming registration at a particular Web site; the confirmation may be parsed, and relevant user name and password data may be extracted for storage in the addressee's user profile data record. As another example, incoming electronic correspondence may be parsed for content, filtered according to user preferences, and forwarded to appropriate destination addresses based upon the content (e.g. news, stock market alerts, special e-commerce or retail offers, personal correspondence, and so forth).

As indicated above, a convenient aspect of the present invention is that its operation is not limited with respect to location or to a particular computer terminal, workstation, or wireless device employed by the user. Since the functionality of the e-mail filtering, e-mail forwarding, e-mail data extraction and organization, and receipt capture features may reside entirely on the central server, the system's operation does not require special software or hardware on the client or user side. A user may take advantage of the system's features from virtually any Internet-capable computer terminal or device.

BRIEF DESCRIPTION OF THE DRAWINGS

The above-mentioned and other advantages of the present invention will become more apparent upon examination of the following detailed description of the preferred embodiments thereof with reference to the drawings, in which.

DETAILED DESCRIPTION OF THE PREFERRED EMBODIMENTS

Figure 1:
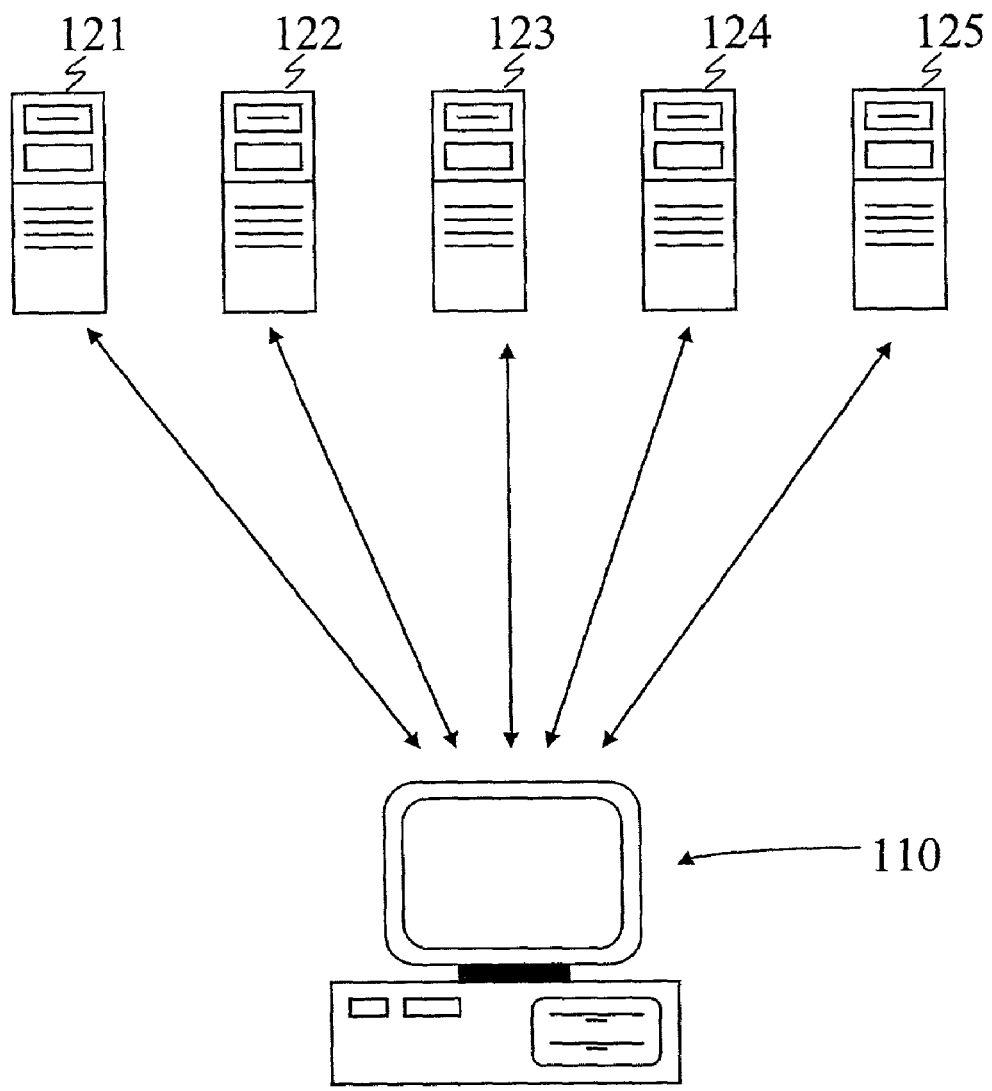
FIG. 1 is a simplified diagrammatic view of the interaction presently required between an Internet user and several servers with which that user may maintain registered accounts.

Turning now to the drawings, FIG. 1 shows a simplified diagrammatic view of the interaction presently required between a typical Internet user and several servers with which that user may maintain at least one registered account. Conventionally, a user connects to the Internet by means of a computer terminal 110 such as a desktop personal computer (PC) or workstation, a laptop, notebook, subnotebook, or portable machine such as a Personal Digital Assistant (PDA), a Personal Communications Systems (PCS), an Internet-enabled wireless telephone, or other wireless hand-held device, and the like. Once connected to the Internet, the user visits World Wide Web (Web) sites and accesses electronic mail (e-mail) accounts through communication with servers, such as those represented by reference numerals 121-125; such communication is generally through the use of one or more software applications, such as a Web browser or an e-mail editor.

Sites which specialize in auctions, sale of goods, service oriented business transactions, and the like via the Internet (e-commerce), frequently require a user to maintain a registered account at the site before the user may be permitted to use services offered at the site. The amount and type of account information for a particular user maintained at any given site varies considerably, depending upon the nature of the business conducted; some examples of the nature of information requested from the user during registration include first and last name, date of birth, mailing address, gender, social security number, credit card numbers and expiration dates, mother's maiden name, and so forth. Billing addresses and preferred shipping addresses are common data requested by e-commerce sites specializing in the sale of goods. In theory, the sites' maintaining respective databases of such information for a registered user offers the user convenience and efficiency upon subsequent visits to the Web site. Web sites offering or requiring registration often send registration confirmations via e-mail to newly registered users.

Alternatively, when a user does not maintain a registered account at a particular Web site but wishes to engage in e-commerce, at least some of the foregoing information must generally be provided to the host site in order to complete any commercial transaction. At a minimum, e-commerce sites typically require first and last name, shipping and billing addresses, credit card information including an account number and expiration date, and a valid e-mail address.

Upon completion of a particular transaction, the e-commerce host site may generate an electronic receipt (an e-receipt) which is subsequently transmitted to the e-mail address designated by the user. These e-receipts may include important data relevant to the transaction. In addition to the user-provided data mentioned above, an e-receipt often contains transaction-specific data such as: product identification, quantity, and unit price; an identifying order reference number; the order date and projected ship date; the shipping status; and so forth.

One embodiment of the present invention is directed to identifying inbound e-receipts and extracting the data related to e-commerce transactions. Organization of e-commerce related data as set forth in detail below provides the user with convenient access to important information without requiring repeated access to the host site's server. As will be addressed below, an additional embodiment of the present invention is directed more generally to identifying other types of incoming electronic correspondence (i.e. not necessarily related to e-commerce transactions), and selectively extracting data in accordance with user preferences.

Figure 2:
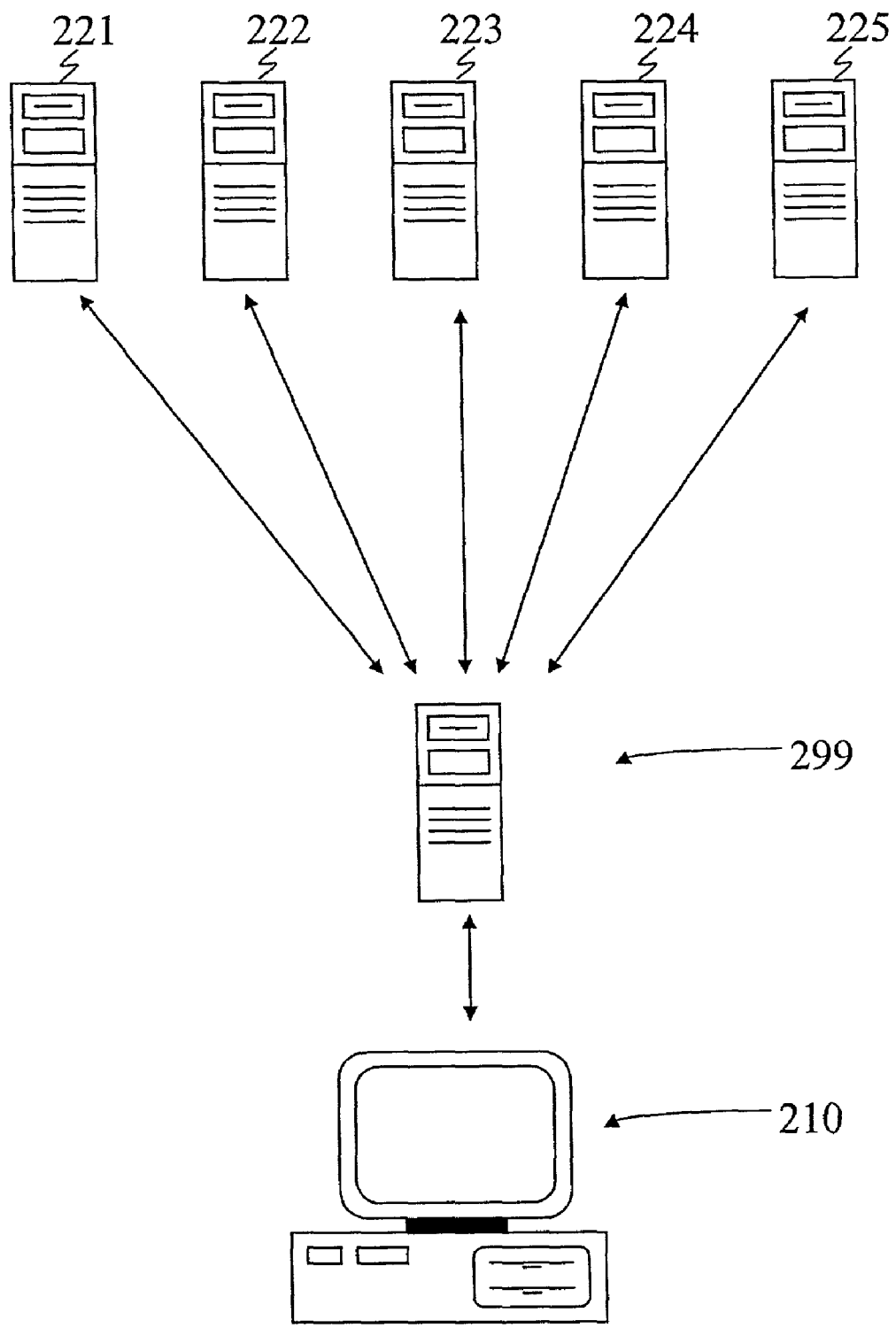
FIG. 2 is a simplified diagrammatic view of the interaction required between an Internet user and several servers with which that user may maintain registered accounts, with the system of the present invention acting as an intermediary.

FIG. 2 is a simplified diagrammatic view of the interaction required between an Internet user and the system of the present invention acting as an intermediary between the user and the various servers with which that user may maintain registered accounts, or at which the user may engage in commercial transactions. The user's computer terminal 210 illustrated in FIG. 2 corresponds to computer terminal 110 illustrated in FIG. 1.

As discussed above, computer terminal 210 may be any type of Internet-capable machine, including PCs and workstations as well as a wide variety of portable devices such as PDAs, PCSs, Internet-enabled wireless telephones, other wireless devices, and so forth. Additionally, users may have access to the Internet through communication and navigation systems installed in vehicles such as automobiles or boats, for example, or through interactive television systems (cable or satellite based), and the like. Those of skill in the art will appreciate that the present invention is not limited by the type of device used to access the Internet; the method and system set forth herein are equally applicable to any and all Internet-enabled devices. Importantly, the method or means by which computer terminal 210 is connected to the Internet is immaterial. That is, the connection may be through traditional land-line telephone "dial-up" service, Digital Subscriber Line (DSL) service, a T-1, T-3, or ISDN network, fiber-optic or cable modem connections, wireless or satellite communications, and the like.

It will be appreciated by those of skill in the art that the method of connection may affect the communication protocols employed by the network hardware as well as the file format required by the user's computer terminal 210. For example, whereas a PC or workstation equipped with a traditional Graphical User Interface (GUI) and Internet browser software may be adapted to display Web content provided in Hypertext Markup Language (HTML), various mobile or wireless devices such as PDAs, PCSs, and the like may be adapted to display different types of markup languages such as Extensible Markup Language (XML), Hand-Held Device Markup Language (HDML), Wireless Markup Language (WML), compact HTML (cHTML), extensible HTML (xHTML), Dynamic HTML (DHTML), and so forth. In general, connection with a mobile or cellular Internet Service Provider (ISP) automatically establishes the correct protocols and determines the proper file format for the specific type of network connection and computer terminal 210. The system of the present invention is not limited to a specific markup language or file format.

Once the connection to the Internet is made, irrespective of the method, the user may employ a software application, such as a Web browser installed on computer terminal 210, for example, to navigate to a Web site hosting a centralized server and database, such as indicated by reference numeral 299. In the case of a PDA, PCS, or other portable or wireless computer terminal 210, Internet navigation and e-mail functionality may be handled by the operating system and proprietary software which is provided by the manufacturer of the device. It is also within the contemplation of the invention to have the Web site provide the necessary functionality, should such a feature become available.

In the several embodiments of the present invention, the user may open a registered account at the central, Web-based server 299. This registration procedure, as with typical Web site registrations, requires the user to select a user name and password for identification and security purposes, respectively. Upon registration with central server 299, the user may login to the registered account on subsequent visits by completing and submitting the login form with the correct user name and password. The foregoing procedures are not substantially different from the typical registration and login procedures required by ordinary Web sites. The present invention provides substantial benefits in terms of convenience and utility, however, after the user is logged in to the registered account at central server 299.

In particular, the functionality provided by the system is substantially as follows: effective universal Internet identity and e-mail address; e-mail filtering and forwarding, and, advantageously, e-receipt identification and data extraction; general e-mail identification, content analysis, and data extraction; automatic form filling for virtually any form encountered during Web browsing; simplified registration with other Web servers; and automatic login to sites where a registered account is maintained.

A comprehensive description of the system's functionality with respect to the foregoing form filling, convenient registration, and automatic login features is set forth in copending applications, U.S. Ser. No. 09/561,449, filed Apr. 28, 2000, entitled "METHOD AND SYSTEM OF IMPLEMENTING RECORDED DATA FOR AUTOMATING INTERNET INTERACTIONS", and U.S. Ser. No. 09/687,991, filed Oct. 13, 2000, entitled "METHOD AND SYSTEM OF AUTOMATING INTERNET INTERACTIONS".

The benefits of an effective universal Internet identity and e-mail address have been recognized to the extent that such an arrangement facilitates e-mail filtering and forwarding (see, e.g. the copending related applications noted above). The present invention provides additional functionality directed to e-receipt identification and data extraction (e-receipt capture), as well as general e-mail content identification and data extraction. Various functional aspects of the universal e-mail address, general data extraction, and e-receipt capture features of the present invention are addressed in detail below. Those of skill in the art will appreciate that the functionality underlying the e-receipt capture feature may be expanded to other types of electronic correspondence beyond commercial e-receipts.

Returning to the arrangement of hardware elements illustrated in FIG. 2, it will be appreciated that a user need only login once, to central server 299, during a particular Internet session; subsequent login procedures at various other Web sites or e-mail servers, such as sites 221-225, for instance, require little or no interaction on the part of the user. Data transmission interactions are represented by the arrows in FIG. 2.

Advantageously, central server 299 is adapted to maintain a detailed database for the user, including a vast array of personal information supplied by the user. The data recorded may be both general as well as account-specific. For example, general, or global, information may include first and last name, primary billing address, and social security number, and the like; this information is typically constant, irrespective of the Web site or e-mail server with which an account may be maintained. Examples of account-specific information may include user name and password as well as address information for a particular account at an e-mail server. User data stored at central server 299 preferably includes e-mail addressing, filtering, and forwarding information provided by the user; this information, or e-mail preferences data, may be employed by the system of the present invention to direct and to manage all correspondence directed to the user's account at central server 299.

Importantly, the foregoing general and account-specific information recorded in the database is easily accessible to the user, through login with central server 299, and may be selectively altered by the user at appropriate times through the software program code provided at central server 299 as set forth in detail below. In this regard, the user name and password associated with the user's registered account with central server 299 become global; the user need only remember these two items of information to allow the system of the present invention, through central server 299, to serve as an interface with the rest of the Internet universe.

In addition to being relieved of the burden of remembering and organizing an overwhelming amount of information, another particular benefit to the user of the system of the present invention is that the universal user name and password facilitate the e-mail filtering and forwarding, e-mail data extraction and organization, and e-receipt capture features of the present invention, since all correspondence intended for delivery to a particular user is directed through the central server 299.

Figure 3:
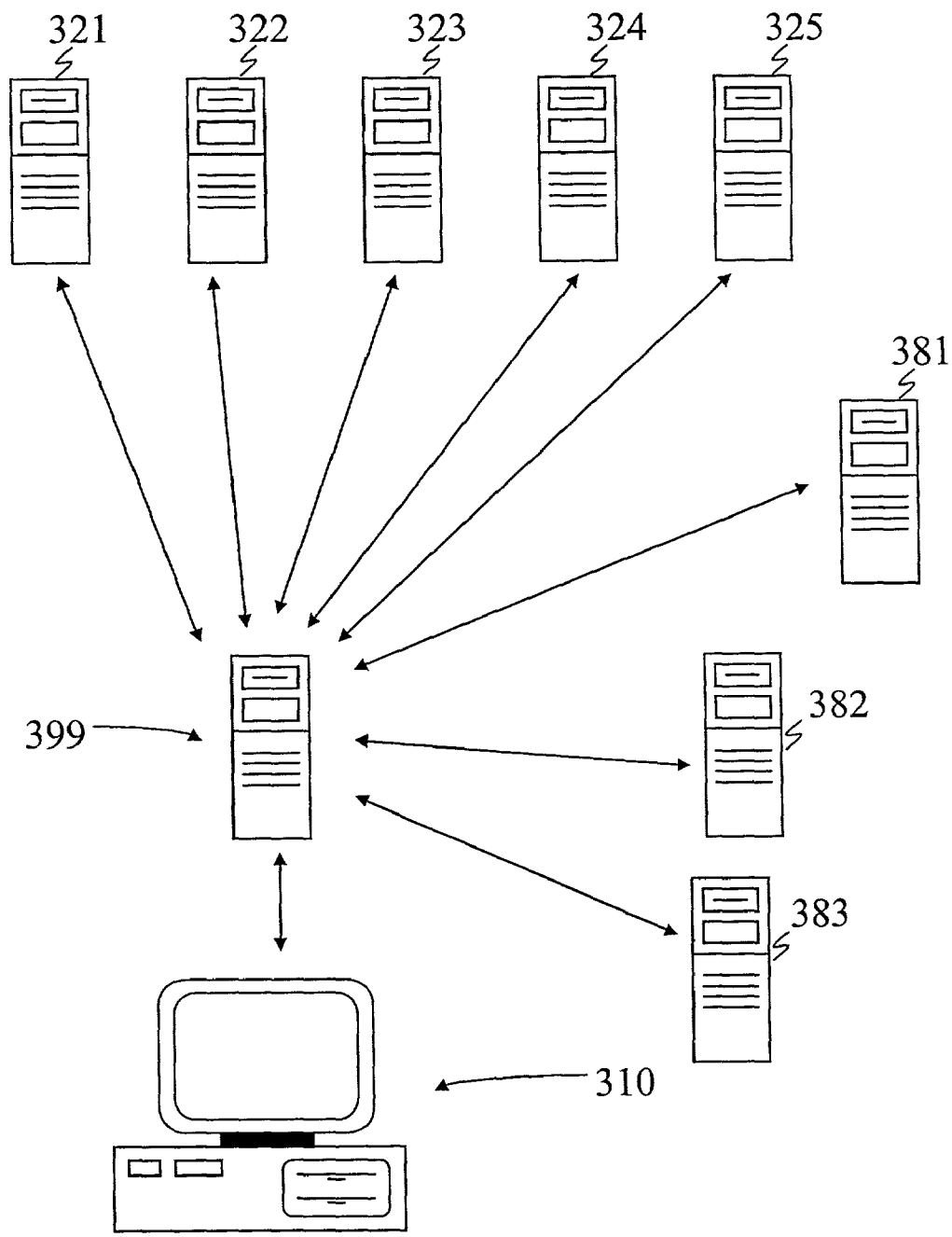
FIG. 3 is a simplified diagrammatic view of the interaction between the central server of the present invention and several servers with which a user maintains registered accounts.

FIG. 3 is a simplified diagrammatic view of the interaction between the central server 399 of the present invention and several servers 381-383 with which a user may maintain independent registered e-mail accounts, each having a unique e-mail address. In FIG. 3, central server 399 corresponds to that represented by reference numeral 299 in FIG. 2, and the user's computer terminal 310 corresponds to computer terminal 210. Various Web sites 321-325 are shown in FIG. 3 along with a plurality of servers, denoted as servers 381-383, at which a user may maintain one or more registered e-mail accounts. The servers 381-383 may, for example, correspond to a user's home e-mail account, school e-mail account, and work e-mail account, respectively. It will be appreciated that a user may maintain more or fewer than three e-mail accounts, and furthermore that more than one e-mail account may be maintained at a single server; accordingly, the arrangement of FIG. 3 is illustrated by way of example only.

According to one embodiment of the present invention, a user may be provided with a universal "virtual" e-mail address upon registration with central server 399. This universal e-mail address may be characterized as virtual because the system may not actually maintain a full service e-mail account for the user at central server 399, but rather may only function to forward incoming mail to one or more of a plurality of registered e-mail accounts at one or more of a plurality of servers designated by the user. For example, e-mail delivered to the user's universal virtual e-mail address at central server 399 may be selectively forwarded to a single account at server 381 exclusively, or it may be selectively forwarded to one or more registered accounts at all of the servers 381-383. In any event, the user's friends, relatives, business contacts, and others representing the entire Internet universe all will be sending electronic correspondence to a single address at central server 399, where it may be redirected according to the user's e-mail preference data stored at central server 399.

It will be appreciated by those of skill in the art that e-mail packet header information must be parsed in order to forward correspondence to the correct address; such parsing of e-mail headers is common in ordinary transmission of electronic correspondence. In addition to simply forwarding incoming e-mail to an account maintained at remote servers 381-383, the incoming mail may be parsed, for example, to determine its origin. In this manner, e-mail originating in a particular domain, for example, may be forwarded to a first account specified by the user, while e-mail originating in a different domain may be forwarded to a second specified account.

It will be appreciated that the utility of such a universal virtual e-mail address may be facilitated by the additional feature of allowing the user to manipulate certain options, such as the e-mail address or addresses to which inbound e-mail should be forwarded, and the conditions under which such forwarding is desired. For example, upon login with central server 399, the user may be allowed full access to change the designated addresses, or to reassign the destination of e-mail originating from a particular domain; since the forwarding addresses can be changed at the central server 399, the user is thus relieved of the burden of informing all Internet contacts of a change in Internet Service Provider (ISP) or other event which may necessitate a change in e-mail address.

As an example, a user may direct e-mail originating from a particular non-commercial domain to a personal e-mail account, since e-mail from such a domain is most likely personal correspondence; in the case where an e-receipt is expected for a purchase which represents a business expense, on the other hand, the user may direct e-mail from a particular e-commerce host site to a business related e-mail account. Ideally, the user may be able to decline acceptance of certain unsolicited e-mail ("spam") outright, such that all mail originating from a particular location, for example, is returned to the sender or otherwise rejected in the future.

As noted above, these e-mail preferences data may be stored as a user profile database record associated with a particular universal virtual e-mail address at the central server 399. The registered user may be able to invoke the program code which accesses this data and allows alteration thereof upon login with central server 399.

The foregoing functionality may advantageously be implemented through program code at the central server 399 as follows. In operation, incoming e-mail addressed to a user's universal virtual e-mail address may be parsed upon arrival at the central server 399; origin and destination address headers of e-mail packets are commonly parsed by e-mail servers so as to enable proper delivery of electronic correspondence. In accordance with this embodiment of the present invention, however, the parsed data may additionally be compared to the user preferences data associated with the universal virtual e-mail address stored in the database at the central server 399, and the address headers may be altered accordingly. Upon completion of the comparison and the alteration of the address headers, the e-mail may be forwarded to the destination designated by the user.

In accordance with one embodiment of the invention, the system may further be adapted to parse the contents of incoming e-mail to identify certain types of correspondence; an e-receipt confirming an e-commerce transaction, for instance, may be identified and its contents stored in the database at central server 399. In this manner, the system may monitor and display a user's e-commerce activities without actually monitoring behavior at the various sites, but rather through identifying e-mail transmitted to the user concerning the confirmation and status of a particular order or transaction.

In accordance with another advantageous embodiment, incoming e-mail other than e-receipts may also be parsed for content, as described below, and subsequently forwarded according to user preferences depending upon the nature of the data content. For example, news and stock alerts may be identified and forwarded to a business e-mail account, while special offers or rebates from e-commerce vendors similarly may be identified and forwarded to a personal e-mail account. In this embodiment, for example, itinerary data in a confirmation e-mail sent by an airline may be extracted and stored in the addressee's profile data record.

Figure 4:
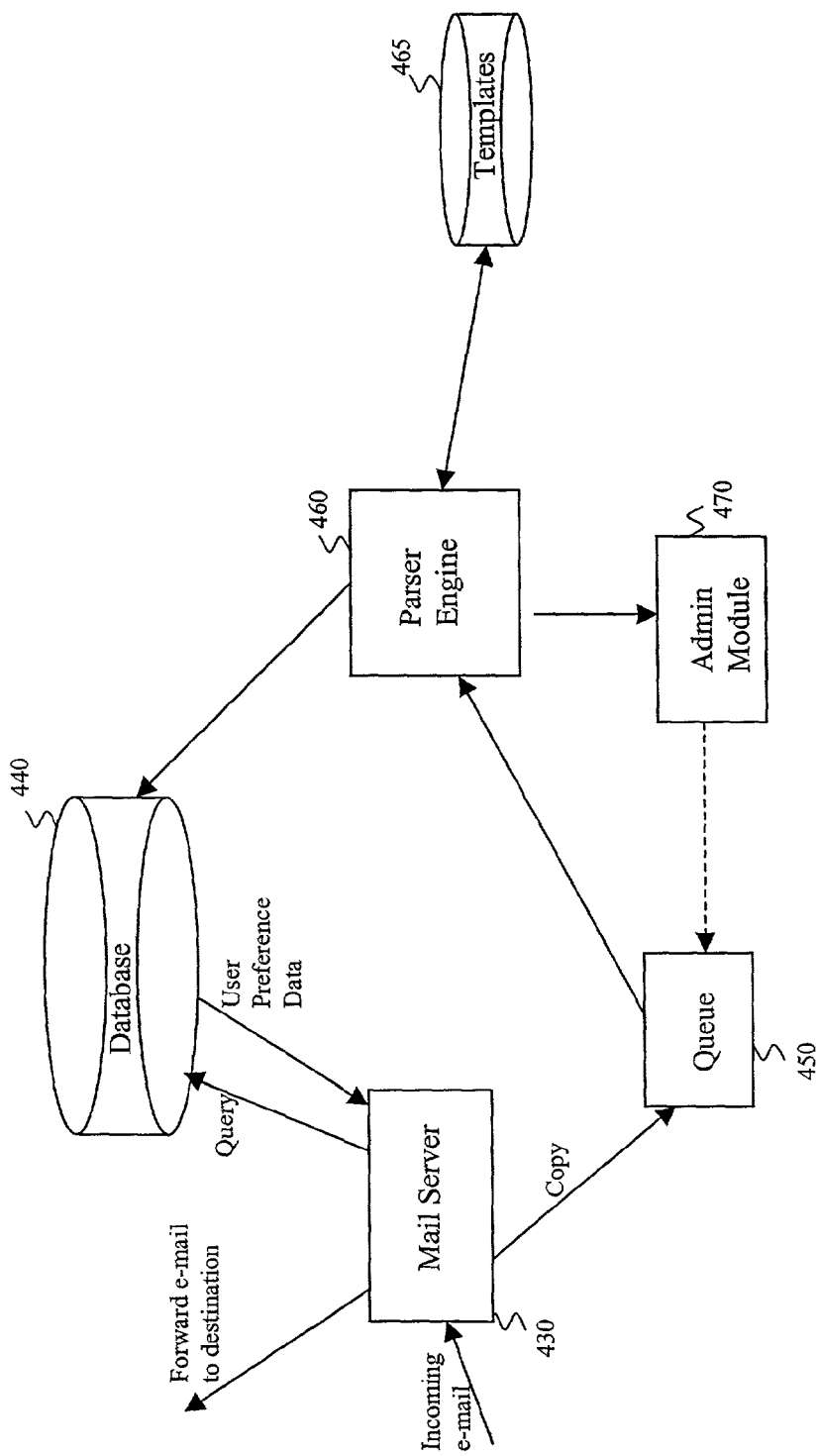
FIG. 4 is a simplified diagrammatic view of the data extraction and e-receipt capture feature of the present invention.

FIG. 4 is a simplified diagrammatic view of the data extraction and e-receipt capture feature of the present invention, which identifies e-mail data content and e-receipts and extracts selected types of data, such as e-commerce data, for example. The central server of the present invention preferably includes an e-mail server 430 to which all incoming e-mail is directed; this inbound e-mail may be addressed to a user's universal virtual e-mail address as described above.

In operation, e-mail server 430 accepts incoming e-mail from the various domains which make up the Internet universe. Program code resident at e-mail server 430 may read the incoming e-mail packet header information and identify both the origin as well as the sender of the correspondence. Additional program code at e-mail server 430 may query the database 440 at the central server, identify the appropriate user preferences data record, update the address header data in accordance with the user's preferences, and redirect the e-mail to the designated e-mail account.

While forwarding the e-mail to the account specified in the user preferences record in database 440, e-mail server 430 may employ program code to copy the correspondence and to place the copy, rather than the original, in a queue 450 for parsing. It will be appreciated that this procedure is efficient and provides timely delivery of the original e-mail to its ultimate destination, while a copy is parsed to determine if the correspondence is an e-receipt or contains data content selected for extraction by e-mail preferences; this is the arrangement illustrated in FIG. 4. In an alternative embodiment, the system may operate exclusively with the original e-mail.

In one embodiment, each e-mail may be copied to two files for parsing: one file representing the header; and one representing the text, or body, of the correspondence. Generally, such a scheme may expedite the parsing process, since the header file may be parsed first; in any event, as noted above, the header information must be parsed and analyzed for forwarding purposes, making this bifurcated parsing scheme more efficient. In this manner, only some e-mail bodies, i.e. those with headers which may be indicative of data content of interest (such as, for example, e-receipts), need be parsed and analyzed. Alternatively, copying and parsing may be effectuated using a single file representing both header information as well as the body of the e-mail; this alternative may be particularly desirable in the case described above where e-mail may be forwarded according to its data content, for example.

Whether one or more files are created during copying, each copied file may be assigned a unique message identifier, sequence number, or some other convenient identification tag or marker. Such identification enables the system of the present invention to direct data to the correct user database records following e-receipt identification and/or general e-mail data extraction.

As illustrated in FIG. 4, an e-mail string (or stream of e-mail data) is sent by a queue manager program code module or other software script (not shown) from queue 450 to a parser engine 460, which represents the program application code and logic underlying the e-receipt capture and data extraction features of the present invention. By way of specific example, but not by way of limitation, operation of the FIG. 4 embodiment will be described below in the context of identifying e-receipt data. Program code at parser engine 460 attempts to identify e-receipts as set forth below.

As noted above, the first step in determining whether a given e-mail is an e-receipt may involve parsing header data to determine the origin of the correspondence; this may include the domain from which the e-mail originated. Program code at parser engine 460 may access a template database 465 in an attempt to match the e-mail with a known, or mapped, template.

By way of example, template database 465 may maintain, for each known e-commerce host or e-receipt provider domain, one or more templates which may serve as models of the various kinds of e-commerce related correspondence normally originating from that specific domain. For example, while a receipt may generally provide certain information in a particular format, a shipping status or backorder report generally provides different information in a different format, and a shipping confirmation notice provides still different or additional information in yet another format. It will be appreciated that other types of correspondence may be provided by various e-commerce hosts.

In one embodiment, each of the various known categories of correspondence (i.e. receipt, backorder report, projected shipping date notice, shipping confirmation, and so forth) for a variety of e-commerce vendors and service providers may have a unique template stored in a database record in template database 465. After the header information of the incoming correspondence has been parsed, such database records may be accessed by parser engine 460 so as to facilitate parsing and to assist in identifying relevant data from the body of the e-mail efficiently.

The parsing process may employ various filtering and/or weighting techniques, in accordance with the information included in the various templates, for determining the nature of the correspondence. A confidence level may be assigned to each incoming e-mail relative to each template. Such filtering and/or weighting techniques are well known to the ordinarily skilled artisan, and so need not be detailed here.

By way of example, e-mail originating from the ".edu" domain (for educational institutions or entities) may be less likely to be of a commercial nature than e-mail originating in the ".com" domain (for individuals, commercial enterprises, and businesses). Accordingly, e-mail originating in certain domains, such as ".com" for instance, may be weighted differently from e-mail originating in others. Similarly, some e-mail addressed to multiple recipients, (more than one or more than two, for example), may be weighted so as to be distinguished from e-mail addressed to a single recipient, where the latter may be assumed more likely to be a receipt. It will be appreciated that other criteria, such as the content of the "Subject:" line, may be used for filtering purposes, particularly in cases where e-receipt providers use predictable strings in the subject line; this predictability will be reflected in the template. Various aspects of e-mail may be examined and weighted, depending upon the nature and content of the templates extracted from template database 465 to which the incoming e-mail is compared; those aspects enumerated here are listed by way of example only, and not by way of limitation.

Parser engine 460 may include program code to filter through packet header data and e-mail content (depending upon the instructions in the template) and to apply weighting functions (again, depending upon the template) based upon various criteria such as, inter alia, the origin domain and number of recipients as discussed above. In one embodiment, the weighted results of the foregoing filtering process may be forwarded to a scoring engine or other program code which may employ the weighted results in an algorithm for providing each e-mail with a final score or confidence level relative to each template to which it has been compared. Generally, in accordance with this embodiment, a confidence level above a certain threshold with respect to one or more templates may be considered to establish the e-mail as an e-receipt. Similarly, a confidence level below a certain threshold with respect to all the analyzed templates may be considered indicative of the e-mail's status as not an e-receipt.

If the incoming e-mail can be associated with (i.e. its format matches) an existing template as evidenced, for example, by a confidence level above a certain threshold, extracting relevant e-commerce or other data is a fairly straightforward matter, since the information provided and the specific format in which it is presented is known. The information may be extracted according to extraction instructions provided in the template and subsequently stored in database 440 according to user preferences. If, on the other hand, the e-mail has been determined not to be of interest, as evidenced by a confidence level which does not meet a particular threshold, for instance, the e-mail may be ignored by the system and deleted.

The foregoing threshold confidence levels may be the same; that is, the system may be adapted to employ Boolean logic. In such an embodiment, incoming e-mail may either be established as e-receipt material or not. Alternatively, a questionable confidence range may be provided, wherein, for e-mails having middling scores between the threshold levels, the program code at parser engine 460 does not make a determination unilaterally. In this embodiment, as illustrated in FIG. 4, parser engine 460 may be adapted to forward a copy of the questionable e-mail to an administration module 470 for further analysis.

Administration module 470 may be a Web-based or server-side application, for example, designed for administrative viewing (preferably by an operator) of questionable email. In this embodiment, such a server-side application may read the e-mail data forwarded from parser engine 460 and display information relevant to the e-receipt inquiry to an administrator. The administrator may ultimately make the determination as to whether a given e-mail is, or is not, an e-receipt. In such an embodiment, e-receipts may be returned to queue 450 for subsequent processing, while general correspondence may preferably be deleted.

In parser engine 460, information concerning e-mail which has been determined to be no more than general correspondence may be deleted, as noted above. On the other hand, any given e-mail which has been established as an e-receipt or containing data of interest may be parsed such that relevant data concerning the e-commerce transaction may be extracted. As noted above, if the format of the e-mail matches an existing template, data extraction may proceed in accordance with the format of the template and the instructions provided therein. If no template is matched, however, the markup language of the e-mail must be examined in detail to locate and to extract the appropriate data.

Though an associated template may not be found for a particular e-receipt, program code at parser engine 460 may be employed to examine the markup language of the identified e-receipt so as to identify items or elements which may be similar to elements in known or mapped templates. That is, an iterative program procedure may sort through the data content and make comparisons with one or more templates stored in template database 465; though the entire format of the e-receipt may not be known at the beginning of the iterative procedure, it is likely that much of the data contained in the markup language will be matched to known elements or fields in existing templates. Such an iterative procedure has two advantages: first, relevant data may be extracted from the e-receipt based upon similarities with data in existing templates; and second, a template may be constructed, or reverse engineered, as the data is extracted.

In still another embodiment, general parsing techniques may be employed in lieu of a template-dependent system. While templating, and in particular matching parsed data in accordance with pre-existing or dynamically generated templates, may provide for increased accuracy in extracting and organizing desired data in certain circumstances, those of skill in the art will appreciate that general parsing algorithms may be used for examining data content for particular information. Use of such general parsing and data extracting methods may be particularly desirable in an embodiment directed to extracting data from general or personal correspondence, i.e. data which is not necessarily related to e-commerce.

Output from parser engine 460, i.e. data extracted from e-receipts, may be written, for example, to a file in a desired markup language such as HTML, XML, and so forth. In certain instances, it may be desirable to send extracted data directly to central database 440 in raw form. In the latter case, additional program code may be provided for querying database 440, extracting desired data, and selectively displaying e-commerce information in a user-friendly or user-specified format; such additional program code may advantageously reside on the server-side (i.e. at the central Web-based server of the present invention), or alternatively, on the client-side (e.g. at a user's computer terminal or wireless device).

Figure 5:
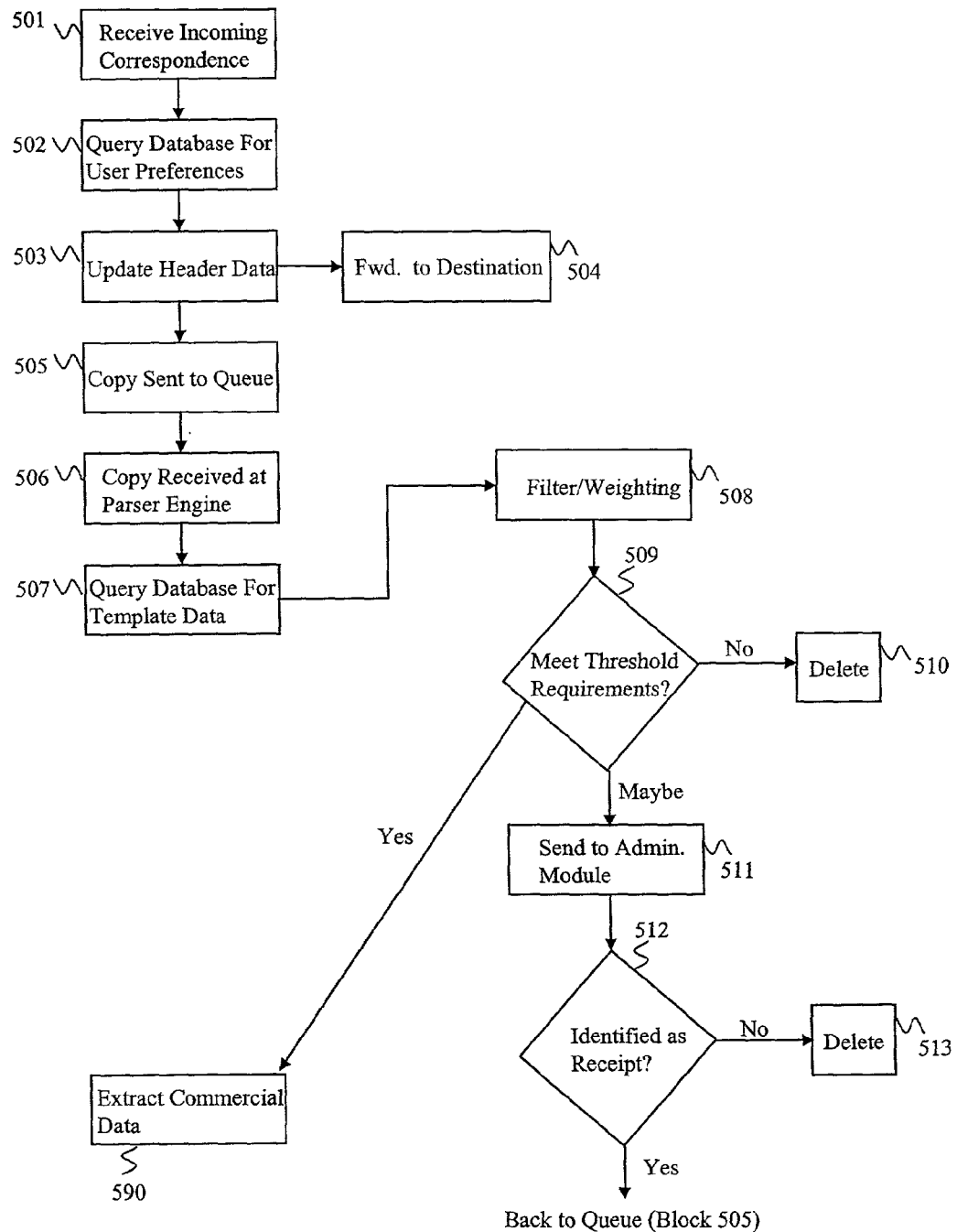
FIG. 5 is a simplified flow chart showing a general progression of one embodiment of the e-receipt capture feature of the present invention.

By way of example, FIG. 5 is a simplified flow chart illustrating a general progression of one embodiment of the e-receipt capture feature of the present invention. In the following discussion, that embodiment will be described with reference to the general process flow depicted in FIG. 5, and several variations are noted. Again, it should be appreciated that the general progression illustrated in FIG. 5 may also be useful for extracting data from generic electronic correspondence; that is, the FIG. 5 embodiment is not limited to e-receipt identification and data extraction, but is also applicable to data extraction from other types of e-mail.

Initially, as shown at block 501, inbound e-mail, i.e. addressed to a user's universal virtual e-mail address as described above, may be received at an e-mail server. Program code resident at the e-mail server may read incoming e-mail packet header information so as to identify both the origin as well as the sender of the correspondence. As indicated at block 502, program code at the e-mail server may query a database at the central server in order to identify the appropriate user preferences data record related to the origin domain and/or the sender of the incoming e-mail; in this manner, the system may determine the ultimate destination, which has previously been specified by the user, for the various e-mail items delivered to the universal address.

At block 503, the address header data may be updated for any given correspondence in accordance with the user's preferences; this alteration of the address header data allows the system to redirect e-mail to the designated e-mail account as shown at block 504. In such an embodiment, i.e. where the original e-mail is forwarded to its destination address before being sent to the parser engine as described above, a copy may be made at the e-mail server. While the e-mail server is forwarding the original at block 504, program code may be copying the correspondence and forwarding the copy, rather than the original, to a queue for subsequent parsing; this is shown at block 505.

Each incoming e-mail, in turn, is transmitted from the queue to the parser engine, as represented at block 506. During parsing, the parser engine may query data records maintained in a template database, as shown at block 507. Upon retrieving template records, the parser engine may attempt to identify potential similarities between the parsed e-mail and any known, or mapped, template. Similarities may be identified, for example, through filtering and/or weighting of the parsed e-mail data, such as occurs at block 508. As noted above, the filtering and/or weighting techniques applied by the system are well known in the art, and may include comparison of e-mail data with template data extracted from the template database. As noted above, it may be desirable to provide the e-mail with a total score or weight.

At decision block 509, the overall score or weight for the e-mail, which may be assigned based upon the foregoing filtering and weighting, may be measured against one or more threshold values. The comparison result may generally be accepted as a determination of the presence or absence of e-commerce data, or any other type of data desired, in the e-mail. Where the overall score of an e-mail falls within a certain range relative to a particular threshold, the e-mail may be eliminated as a potential e-receipt, in which case the e-mail is deleted as shown in block 510. On the other hand, where the score of an e-mail falls within a certain range relative to a particular threshold, the e-mail may be identified as an e-receipt, in which case the system may proceed to block 590, where e-commerce data is extracted.

As noted above with reference to FIG. 4, it is possible that decision block 509 may have an additional outcome, i.e. a "Maybe" result. If the filter and/or weighting techniques fail to provide a given e-mail with a definitive score relative to the thresholds defined by the system, the e-mail may be forwarded to an administration module, as shown at block 511, for analysis by an administrator. The administrator's examination of the header and text of the e-mail will enable a positive determination as to the nature of the correspondence, as represented at decision block 512. If the e-mail is determined not to be an e-receipt, it will preferably be deleted at block 513.

If the e-mail is identified by the administrator as an e-receipt at decision block 512, on the other hand, the copy of the e-mail may be returned to the queue at block 505, for example, for additional parsing by the parser engine. In such a case, the copy of the e-mail may be provided with a short data indicator field or flag which serves as positive identification of the correspondence as an e-receipt. In this manner, when an e-mail is on its second trip through the parser engine, i.e. it has already been determined to be an e-receipt by the administrator, a flag may be set (for example, by the administrator) such that the parser engine will be required to return a "Yes" result at block 509.

As noted above with reference to FIG. 4, a system which forwards original e-mail to its ultimate destination (as shown in block 504 in FIG. 5) before examining its contents in detail may be efficient and provide timely delivery. On the other hand, it is within the scope and contemplation of the present invention to provide an alternative scheme wherein the system may operate exclusively with the original e-mail. In that regard, it will be appreciated that various individual blocks or sections of the diagram illustrated in FIG. 5 may be relocated or eliminated in several alternative embodiments.

For example, in the case where a full-service e-mail account may be maintained for each user at the central server of the present invention, there may be no requirement for forwarding e-mail to an additional account or sever at another destination; in such a situation, updating header data at block 503 and forwarding e-mail at block 504 both may be unnecessary. Though the system may not be directing e-mail to other locations as specified in the user preferences record in the database, querying the database such as represented in block 502, may still be desired in this embodiment. Incoming e-mail may be prioritized, censored, deleted automatically, or returned to the sender, for example, depending upon the user's preference data as recorded in the database, as described above. Those of skill in the art will appreciate that block 502 may be advantageously inserted at various locations in FIG. 5, even in an embodiment which does not employ the forwarding feature.

Similarly, copying incoming e-mail and sending only a copy to the queue, as in block 505, may be unnecessary or undesirable in certain situations; where bandwidth and system resources are sufficient, for example, it may be advantageous for the system to parse original e-mails directly, without copying and prior to forwarding; in such a system, incoming e-mail may be sent from block 501 directly to block 506 in FIG. 5. Such a strategy may provide more options and more convenience for a user. As an example, a user maintaining an e-commerce specific e-mail account may wish to direct e-receipts, exclusively, to that account; in this exemplary embodiment, the system of the present invention may be adapted to forward e-mail to such an exclusive account contingent upon the result of block 509 in FIG. 5, for instance. In accordance with this potentially desirable sequence of events, the parsing and the identification of e-commerce data may occur prior to copying or forwarding any particular e-mail.

It should be noted that various adaptations are possible following the extraction of e-commerce data, i.e. block 590 in FIG. 5. For example, extracted e-receipt data may be written directly to the central database maintained by the central server of the system as discussed above with reference to FIG. 4. In such an embodiment, program code may allow a user access to the appropriate database records upon login with the central server. Alternatively, the data may be inserted into a markup language document formatted according to a user's preferences and forwarded directly to the user, at a specified address and in the desired format. In this manner, all the e-commerce data provided to an individual user may be presented in a consistent format selected by the user, irrespective of the original format, for example.

For each e-receipt or e-commerce related correspondence, some or all of the following information may be extracted from the incoming e-mail's markup language: item identification or description; quantity ordered; quantity shipped; total and per-unit price; total and per-unit tax; shipping cost; purchase date; credit card type, number, and expiration date; discount or coupon redemption; order status; order number; confirmation number; tracking number (for shipments); receipt date; and any reference numbers or comments provided by the e-commerce host. It will be appreciated that the foregoing list is not exhaustive, and is given by way of example only, and not by way of limitation.

As noted above, it may be desirable to maintain one or more detailed database records of the e-commerce related information extracted from the identified e-receipts for each registered user of the system. Upon login with the system of the present invention, users may access program code at the central server and thus be enabled selectively to access records of e-commerce activity. Data concerning on-line purchases as extracted from captured e-receipts may be maintained in the system for a certain period of time, for example, such as one calendar year or one fiscal year.

It should also be recognized that users may desire the option to manipulate, to alter, or to disable various features of the system. Accordingly, program code may be provided such that, upon login with the system, users may further be enabled to adjust certain aspects of the system's functionality. In such an embodiment, a user may select from one or more options related to the type of information displayed, the display format, or the duration of data retention, for example. Additionally, the user may be provided with an option for selectively enabling or disabling the e-receipt capture feature.

Additionally, it will be apparent from examination of FIGS. 4 and 5 that the present invention is capable of identifying types of electronic correspondence other than e-receipts. The contents of template database 465, for example, may affect the data identification and extraction processes. As noted above, the system may be configured to identify user name and password data from e-mail confirming a Web site registration, for example, or to extract data from an e-mail confirming a travel itinerary sent by a travel agent's reservation system; the system may distinguish news stories from stock updates. Data extracted from electronic mail may be stored in the addressee's database record maintained at the central server of the system.

As with e-receipt data, maintaining a database record of the data content of other types of e-mail provides a user with substantial benefits upon login with the system of the present invention. For example, users may access program code at the central server and thus be enabled selectively to access records and make those records available to other software programs. Data concerning the date and time of an upcoming meeting or event, as extracted from an e-mail reminder, for instance, may be maintained in the system and accessed by a personal or company calendar/planner software program; as an example, PDAs typically are equipped with calendar and organizer software. The travel itinerary from the foregoing example may be exported to, or accessed by, a central or remote calendar function such as installed on a PDA, and the user's schedule, calendar, and/or digital agenda may be updated automatically. Similarly, if a colleague e-mails a change of telephone number or other contact information, the new contact data may be parsed from the markup language of the e-mail and either: stored in the central database; used to update the addressee's software automatically; or both. As with the e-receipt embodiment, users may further be able to adjust or to disable certain aspects of the system's functionality.

With the functionality of the system residing on the server-side, proprietary or additional software need not be installed at the client-side. A registered user of the system may obtain records of e-commerce activity from any Internet-enabled computer terminal, without having to login to the host site's server, and without having to provide order number or payment authorization data. The information will be available to the user regardless of the e-mail address to which a particular e-receipt was directed by the system.

It will be appreciated by those of skill in the art that the present disclosure contemplates numerous forms of electronic correspondence; references herein to electronic correspondence, either of a commercial or a private nature, e-receipts, e-commerce data, personal e-mail correspondence, and the like, are exemplary only, and are not intended to be construed in any limiting sense. It is within the scope and contemplation of the present invention to apply the teachings herein to electronic correspondence of all forms.

The preferred embodiments disclosed herein have been described and illustrated by way of example only, and not by way of limitation. Other modifications and variations to the invention will be apparent to those skilled in the art from the foregoing detailed disclosure. While only certain embodiments of the invention have been specifically described herein, it will be apparent that numerous modifications may be made thereto without departing from the spirit and scope of the invention.

What is claimed is:

1. A system for capturing electronic receipts from electronic mail messages comprising:
   a first server computer configured for receiving a plurality of electronic mail messages and for parsing said electronic mail messages to identify a subset thereof which comprise commercial correspondence having commercial data related to a commercial transaction;
   wherein said plurality of electronic mail messages comprises electronic mail messages comprising commercial correspondence and electronic mail messages not comprising commercial correspondence; and
   program code residing on said first server computer for creating receipt data by extracting said commercial data from said subset of electronic mail messages which comprise commercial correspondence.

2. The system of claim 1, wherein said first server computer permits display of receipt data.

3. The system of claim 1, further comprising:
   a database at said first server computer,
   wherein said first server computer permits alteration of header data of said electronic mail messages in accordance with data records stored in said database.

4. The system of claim 3, wherein said program code comprises:
   instructions for storing said receipt data. in said database.

5. The system of claim 4, wherein said first server computer permits extraction of said receipt data from said database.

6. A method of capturing electronic receipts from electronic mail messages, the method comprising the steps of:
   receiving a plurality of electronic mail messages by a first server computer, said plurality of electronic mail messages comprising electronic mail messages comprising commercial correspondence and electronic mail messages not comprising commercial correspondence;
   parsing by said first server computer said electronic mail messages to identify a subset thereof which comprise commercial correspondence having commercial data related to a commercial transaction; and
   creating by said first server computer receipt data by extracting said commercial data from said subset of electronic mail messages which comprise commercial correspondence.

7. The method of claim 6, further comprising the step of:
   updating by said first server computer header data of said subset of electronic mail messages.

8. The method of claim 7, wherein said step of updating header data further comprises the steps of:
   querying a database of address data; and
   altering header data of said subset of electronic mail messages in accordance with a result of said step of querying.

9. The method of claim 6, wherein said step of extracting further comprises the steps of:
   querying a database of template data; and
   comparing each of said subset of electronic mail messages with said template data obtained from said step of querying.

10. The method of claim 6, further comprising the steps of:
   providing a database for storing receipt data; and
   storing identified commercial data as receipt data in said database.

* * * * *